United States Patent [19]

Farber

[11] 3,879,471
[45] Apr. 22, 1975

[54] POLYETHERS HAVING β-HALOTHIOETHER SIDE CHAINS

[75] Inventor: Hugh A. Farber, Midland, Mich.

[73] Assignee: The Dow Chemical Company, Midland, Mich.

[22] Filed: Aug. 1, 1969

[21] Appl. No.: 846,950

[52] U.S. Cl........... 260/609 R; 260/91.3 R; 260/79; 260/33.2 R; 260/615 P
[51] Int. Cl. ........................................ C07c 149/14
[58] Field of Search ................................. 260/609 A

[56] References Cited
UNITED STATES PATENTS
2,619,508   1952   Mikeska et al. ................ 260/609 A
3,415,902   1968   Hickner et al. .................. 260/79 X Primary Examiner—Lewis Gotts
Assistant Examiner—D. R. Phillips
Attorney, Agent, or Firm—Michael S. Jenkins

[57] ABSTRACT

Low molecular weight polyethers having utility as plasticizers and release agents comprise repeating monomer units represented by the general formula:

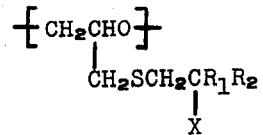

wherein $R_1$ and $R_2$ are separately hydrogen or a monovalent organic radical and X is halogen.

3 Claims, No Drawings

POLYETHERS HAVING β-HALOTHIOETHER SIDE CHAINS

BACKGROUND OF THE INVENTION

This invention relates to novel low molecular weight polyethers having β-halothioether side chains and their utility as plasticizers and release agents.

It is well known to prepare polyethers by polymerizing an alkylene oxide (so-called epoxide) alone or with other alkylene oxides, usually in the presence of an active hydrogen activator such as an alcohol or a polyol. Such polymerizations are generally facilitated by using a Friedel-Crafts catalyst such as boron trifluoride and the like to yield polymers represented by the general formula:

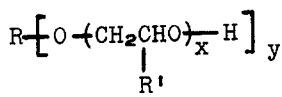

wherein R is hydrogen or the residue of an organic active hydrogen initiator and R' is hydrogen or alkyl and $x$ and $y$ are individually positive whole numbers.

It is also known to polymerize epihalohydrin alone or with other epihalohydrins or alkylene oxides, preferably in the presence of an active hydrogen initiator and Friedel-Crafts catalyst, to yield polyethers in which at least a portion of the side chains are haloalkyl.

As taught in U.S. Pat. Nos. 2,619,508 and 3,415,902, the halogen atoms of the side chains can be replaced with alkylthio radicals or hydroxyalkylthio radicals by reacting the polyether having haloalkyl side chains with alkali metal mercaptides or mercaptoalkanol dissolved in alkali.

Low molecular weight polyethers having β-halothioether side groups have not been previously known.

SUMMARY OF THE INVENTION

In accordance with the present invention low molecular weight polyethers having pendant β-halothioether side chains are provided. These polyethers possess surprising properties making them useful as plasticizers and release agents for various organic plastics.

Characteristically, these novel polyethers comprise at least 10 mole percent of repeating monomer units represented by the general formula:

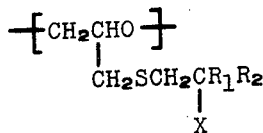

wherein $R_1$ and $R_2$ are separately hydrogen or a monovalent organic radical and X is halogen. Such polyethers are further characterized as having molecular weights less than about 20,000.

In addition to their utility as plasticizers and release agents, these novel polyethers are useful chemical intermediates as the β-halogen is readily replaced by a variety of functional groups such as amino, mercapto, alkoxy and the like.

DESCRIPTION OF THE PREFERRED EMBODIMENTS

The polyethers of the present invention have as an essential component a repeating monomer unit represented by the general formula:

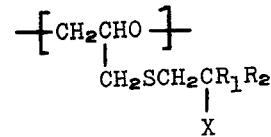

wherein $R_1$, $R_2$ and X are as generally defined hereinbefore. For the essential component to impart the desired functions to the polyether, said component must comprise at least 10 mole percent of the polyether. Illustratively, $R_1$ and $R_2$ are individually hydrogen or monovalent organic radicals such as alkyl and substituted alkyl, aryl and substituted aryl, aralkyl and substituted aralkyl, cycloalkyl and substituted cycloalkyl, aryloxy, alkoxy, poly(alkyleneoxy)alkyl, poly(alkylenethio)alkyl and the like. Preferably $R_1$ and $R_2$ are individually hydrogen, alkyl having from 1 to 12 carbon atoms, aryl having from 6 to 12 carbon atoms, hydroxyalkyl having from 2 to 12 carbon atoms, aryloxyalkyl with aryl having from 6 to 12 carbon atoms, alkoxy having from 1 to 12 carbon atoms and the like.

Illustratively, X is chloro, bromo and iodo, with chloro and bromo being preferred.

These polyethers have molecular weights ranging from a few hundred up to about 20,000 with preferred polyethers ranging from 300 up to 15,000. Particularly effective plasticizers are the polyethers having molecular weights ranging from about 300 to about 10,000.

In preferred embodiments the polyethers are more specifically represented by the general statistical formula:

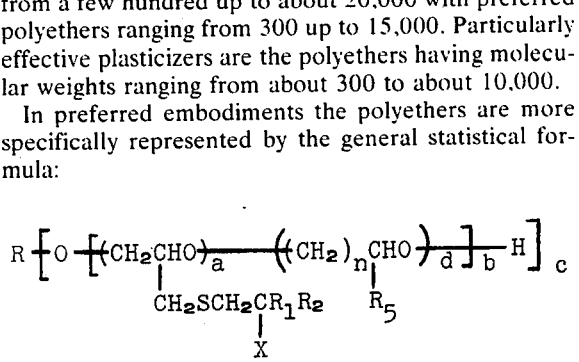

wherein R is hydrogen or the residue of an organic active hydrogen initiator; $R_5$ is hydrogen or a monovalent organic radical with the valence existing on a carbon atom; a is a positive integer and d is 0 or a positive integer provided that the ratio of a to d is such that the polyether contains at least 10 mole percent of

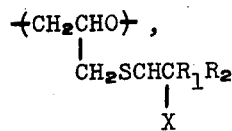

preferably the ratio is from about 1:8 to about 1:0, b is a positive integer, preferably from 1 to 125, c is a positive integer, preferably from 1 to 8 and n is a positive integer from 1 to 4.

Exemplary of $R_5$ are hydrogen and monovalent radicals such as alkyl and substituted alkyl, aryl and substituted aryl and the like. Preferably, alkyl has from 1 to 4 carbon atoms and aryl has 6 to 12 carbon atoms. Substituted alkyls include haloalkyl; mercaptoalkyl; alkoxyalkyl wherein alkoxy has from 1 to 20 carbon atoms, particularly alkoxymethyl; aryloxyalkyl wherein aryloxy has from 6 to 20 carbon atoms, particularly aryloxymethyl, alkylthioalkyl wherein alkylthio has 1 to 20 carbon atoms and the like. Substituted aryls include haloaryl, mercaptoaryl, alkoxyaryl, aryloxyaryl, and the like.

It is further understood that $R_5$ may be different radicals within a single polyether molecule. For example, the polyether may have the statistical formula:

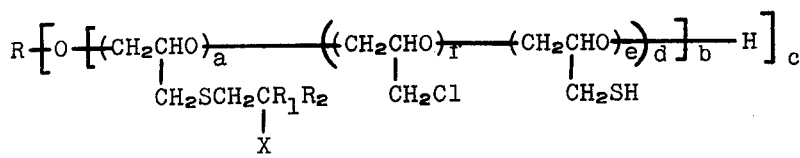

wherein $e$ and $f$ are positive integers.

In general the polyethers of the present invention can be prepared by first polymerizing an epihalohydrin or copolymerizing the epihalohydrin with one or more alkylene oxides and subsequently replacing at least a portion of halogen atoms on the polyether side chains with haloalkylenemercaptide.

Epihalohydrins used in the polymerization step include epichlorohydrin, epibromohydrin, and epiiodohydrin.

Examples of suitable alkylene oxides for use in copolymerization with epihalohydrin are the following: alkylene oxides, such as ethylene oxide, propylene oxide, 1,2-butylene oxide, 2,3-butylene oxide, isobutylene oxide and octylene oxide; glycidol; glycidyl ethers, such as methylglycidyl ether, allylglycidyl ether, phenylglycidyl ether, butylglycidyl ether, octylglycidyl thioether and p-dodecylphenylglycidyl ether and others such as tetrahydrofuran and trimethylene oxide.

In the copolymerization of epihalohydrin with one or more alkylene oxides, the addition of epihalohydrin and alkylene oxide during copolymerization may be alternated to yield polyethers having haloalkyl side chains in predetermined structural patterns. For example, if one mole of epichlorohydrin and one mole of ethylene oxide are added to 0.1 mole of ethyl alcohol as the active hydrogen initiator, the predominant product obtained would have the statistical formula:

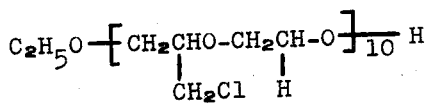

Alternatively, if two moles of epichlorohydrin is added to 0.1 mole of ethyl alcohol, followed by the addition of 5 moles of ethylene oxide, a species having the following statistical formula would be obtained:

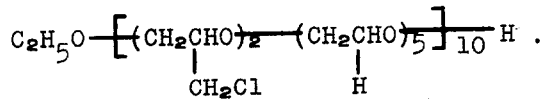

Generally speaking the variation in spacing between the side chains containing halogen atoms along the polyether chain is unlimited, thus it is possible to control the number of the β-halothioether side chains in the final product. In addition, the active hydrogen initiator may contain one or more halogens, such as ethylene chlorohydrin or glycerin dihalide, which halogen would represent reactive sites for the replacement reactions.

In carrying out polymerization or copolymerization to prepare polyethers containing halomethyl side chains as described above, cyclic ether monomer or mixtures of cyclic after monomers, the active hydrogen initiator and a Friedel-Craft catalyst are preferably charged into a closed vessel and heated until polymerization is complete. In the case where a copolymer is being formed, the monomers, a prepolymer or mixture thereof may be charged simultaneously or consecutively or alternatively one or the other in whatever mole ratios are needed to form the desired product. The proportion of catalyst may vary from 0.05 to 15 weight percent of the reacting materials, e.g., monomers, prepolymers, or mixtures thereof, with 0.2 to 5 weight percent being preferred. The reaction mass is advantageously agitated during polymerization which is generally carried out at temperatures within the range of 0° to 200°C, preferably from 20° to 100°C. Alternatively, polymerization may be carried out with monomeric and/or polymeric reactants, catalyst and polymer product all dissolved or suspended in an organic diluent. In such instances, equal proportions of diluent are used, with suitable diluents including diethyl ether, dioxane, diisopropyl ether, petroleum ether, benzene and n-hexane. It is advantageous to choose a diluent which boils at about polymerization temperature, and to heat the mass to induce gentle reflux, thereby assisting in the close control of the reaction temperature.

Examples of suitable active hydrogen initiators include water and organic active hydrogen initiators such as aliphatic monohydric alcohols, e.g., methanol, ethanol, 2-butanol and 1-octanol; alcohol ethers, such as ethylene glycol monomethyl ether and ethylene glycol monoethyl ether and aliphatic polyhydric alcohols, e.g., ethylene glycol, propylene glycol, 1,3-butanediol, 1,4-butanediol, glycerol and sorbitol; hydroxyl terminated polyethers, e.g., polyethylene glycols, polypropylene glycols, polybutylene glycols and dihydroxypropyl ether of bisphenol A; haloalcohols, e.g., ethylene chlorohydrin and glycerol dichloride; monohydric phenols, e.g., phenol, xylenol and p-chlorophenol; dihydric mononuclear phenols, e.g., resorcinol and hydroquinone; polyhydric mononuclear phenols, e.g., phloroglucinol; dihydric dinuclear phenols, e.g., bisphenol A and bis-p-hydroxyphenyl methane; polyhydric polynuclear phenols, e.g., phenolic novolacs made by condensation of phenol with formaldehyde under acid conditions; sugars, e.g., sucrose, glucose, fructose, maltose and other monodi- and polysaccharides; and other active hydrogen compounds, e.g., thiols, amines and the like.

Examples of catalysts suitable for the polymerization reaction include the Friedel-Crafts catalysts such as the Lewis acids and organometallic products exhibiting the reactivity of Lewis acids, such as $BF_3$, $AlCl_3$, $SnCl_4$, $ZnCl_2$, $FeCl_2$, $FeCl_3$, $FeBr_2$, $FeBr_3$, $BeCl_2$, $BCl_3$, $SbCl_5$, $TiCl_4$, $CoCl_2$, $NiCl_2$, $BiCl_2$, $InCl_3$, $ZrCl_4$, titanium tetraalkyl esters, aluminum alkyls and aluminum alkoxides, diethyl zinc in combination with alumina, or oxygen, HF and complexes of HF with $PF_5$, protonic acids and acid salts such as sulfuric acid, phosphorous acid, phosphoric acid, sodium hydrogen sulfate and the like, and combinations thereof.

The crude polyether product resulting from the polymerization process, in addition to containing the desired epihalohydrin polymer, may contain unreacted monomer. The monomer can be removed by warming the crude product and subjecting it to reduced pressure.

The epihalohydrin polymer is readily converted to polyether having β-halothioether side chains by one of several techniques.

In accordance with one technique the prepared epihalohydrin polymer is dissolved in a mercaptoalkanol having the formula

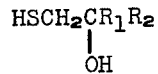

and a base in an inert organic diluent such as a lower alkyl alcohol such as methanol, ethanol, or isopropanol, dimethylformamide, glycols, glycol ethers, and N-methyl pyrrolidone, in which the metal halide salt which forms is poorly soluble. The reaction mixture is heated at 25° to 150°C, preferably 40° to 90°C. The time required depends on the charge. The bases that can be used are the alkali metals, alkali metal alcoholates, alkali metal hydroxides, alkali metal carbonates, quaternary ammonium compounds such as tetramethyl ammonium hydroxide, and tertiary amines such as pyridine, quinaldine, quinuclidine and triethyl amine. A more complete description of this type of reaction and related reactions is given in U.S. Pat. No. 3,415,902.

By a similar technique the intermediate polyether having β-hydroxythioether side chains is prepared by (1) reacting the mercaptoalkanol with alkali metal or alkaline earth metal hydroxide to form a metal β-hydroxymercaptide, e.g.,

and (2) reacting the metal β-hydroxymercaptide with the epihalohydrin polymer, preferably in an inert diluent as described above, to form the intermediate polyether. The resulting polyether having β-hydroxythioether side chains dissolved in an organic diluent is converted to polyether having β-halothioether side chains by adding hydrogen halide to the polyether solution. Preferably gaseous hydrogen halide, e.g., hydrogen chloride, is bubbled into the polyether solution which also contains a water absorbing salt such as sodium sulfate. Such reaction is preferably carried out at temperatures ranging from −10° to about 120°C for periods from about ½ to about 24 hours. The amount of hydrogen halide used is ordinarily at least that amount which is equal on an equivalent basis to the amount of hydroxy to be replaced, preferably in excess of that amount. The amount of hydroxy replaced is at least the amount necessary to yield a polyether in which at least 10 mole percent comprises

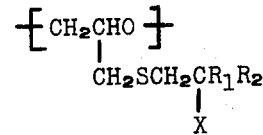

preferably from about 12 to about 100 mole percent.

Mercaptoalkanols which are employed in the above techniques are represented by the general formula:

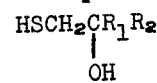

wherein $R_1$ and $R_2$ are as hereinbefore defined. Representative mercaptoalkanols include 2-mercaptoethanol, 1-mercapto-2,3-propanediol, 1-mercapto-2-propanol, 1-mercapto-2-butanol, 1-mercapto-2-hexanol, 1-mercapto-3-propoxy-2-propanol, 1-mercapto-3-propylthiopropanol, 1-mercapto-3-ethoxy-2-propanol, 1-mercapto-3-ethylthio-2-propanol, 1-mercapto-3-methoxy-2-propanol, 1-mercapto-3-octadecylthio-2-propanol, 1-mercapto-3-hexadecyloxy-2-propanol, 1-mercapto-3-methylthio-2-propanol, 2-mercapto-1-phenylethanol and the like. Such mercaptoalkanols are known compounds having known methods of preparation.

Other techniques for the preparation of the polyethers of this invention may also be apparent to the skilled artisan. Such techniques are also contemplated as the particular mode of preparation is not critical.

Following the final reaction step, the reaction mixture containing the resulting polyether having pendant β-halothioether side chains is filtered to remove precipitated materials, and the polyether is recovered by vaporization or other convenient means for removal of diluent and other volatile materials.

The polyethers of the present invention are, in general, viscous liquids substantially insoluble in water but are generally soluble in many organic solvents including lower alkyl alcohols such as methanol, ketones such as acetone and chlorinated hydrocarbons such as methylene chloride depending on the epihalohydrin polymer and mercaptoalkanol employed.

The following examples are given to further illustrate the invention and should not be construed as limiting its scope. In the following specification and claims, all parts and percentages are by weight unless otherwise indicated.

EXAMPLE 1

A polyether intermediate having pendant β-hydroxythioether side chains is prepared by charging 32 g of sodium hydroxide, 62.4 g of 2-mercaptoethanol and 265 g of isopropanol to a 500 ml reaction vessel fitted with a stirrer, condenser and an addition funnel. A 197.8-g portion of propylene glycol-initiated polyepichlorohydrin (molecular weight ~ 1150) is dissolved in 35 g of isopropanol and charged to the addition funnel. The contents of the reaction vessel are stirred for 30 min.

followed by addition of the polyepichlorohydrin to the reaction vessel within a 20 minute period. Temperature of the reaction vessel is held at 70°C via a water bath for about 3 hours. The reaction mixture is filtered and the filtrate yields 214 g of a tan liquid upon volatilization of isopropanol. Analysis of the tan liquid evidenced a sulfur concentration of 10.6% and a chlorine concentration of 19.5%, thus indicating a polyether having a molecular weight of ~ 1400 and the following repeating monomer units in the following statistical proportion:

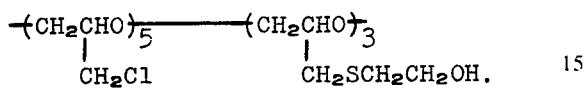

An infrared spectrum exhibiting a definite hydroxyl peak at 3 microns confirms this structure.

A 78.5 g portion of the above polyether intermediate, 50 g of anhydrous sodium sulfate and 250 g of methylene chloride is charged to a reaction vessel fitted with a stirrer, condenser and a hydrogen chloride sparge. Hydrogen chloride is bubbled into the solution slowly for about 9 hours at 25°–30°C. The reaction mixture is placed under a vacuum for 15 minutes and filtered to remove sodium sulfate and other precipitate. The filtrate is evaporated to remove methylene chloride thereby yielding a light brown oil which exhibits little or no hydroxyl absorption at 3.0 microns. Analysis for chlorine and sulfur indicate the formation of a polyether having the following repeating units in the specified statistical proportion:

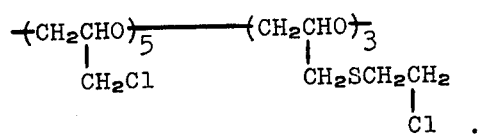

A 10-part portion of the resulting polyether product is added to 100 parts of an 8 percent methylene chloride solution of cellulose acetate having a melting point at 240°–260°C. The resulting mixture is cast onto a glass substrate using a 10 mil doctor blade. The resulting film is readily peeled from the glass substrate and exhibits good toughness and flexibility. In a similar manner, the 8 percent solution of cellulose acetate containing no polyether is cast onto a glass substrate using the doctor blade. The resulting control film is peeled from the glass substrate with more difficulty than the film containing the polyether and tends to break and/or tear during the peeling process. In addition, the control film does not possess the gloss and transparency of the film containing the polyether.

EXAMPLE 2

In accordance with the procedure of Example 1, a solution of 200 g of sodium hydroxide in 750 g of isopropanol is charged to a reaction vessel followed by the addition of 460 g of 1-mercapto-2-propanol. A solution of 494.5 g of the polyepichlorohydrin used in Example 1 in 750 g of isopropanol is added dropwise over a 2 hour period at 25°–50°C. The reaction temperature is increased to 74°C for 5 hours and is stirred overnight without heating. The reaction mixture is filtered and the filtrate yields the polyether product upon volatilization of isopropanol. Analysis of the product evidenced a sulfur concentration of 19.7% and a chloride concentration of 0.9%, thus indicating a polyether having the following repeating monomer units in the specified statistical proportion:

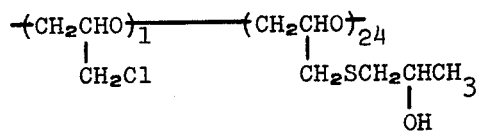

A Volhard titration of sodium chloride formed in the reaction indicated that the substitution of —Cl with

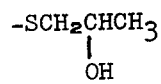

proceeded 96–98% to completion, thus confirming the above proportion.

A 162.4-g portion of the above polyether immediate and 35.5 g of anhydrous sodium sulfate dissolved in 250 ml of methylene chloride are charged to a reaction vessel. Hydrogen chloride is bubbled into the solution at 23°C and the reaction is allowed to proceed overnight. An additional 15 g of anhydrous sodium sulfate is added and the liquid is then decanted away from solid. The liquid is devolatized to remove hydrogen chloride and methylene chloride thereby yielding 125 g of polyether product. Analysis of the product evidenced a chloride concentration of 22% and a sulfur concentration of 17.8%, thus indicating a polyether having the following repeating monomer units in the specified statistical proportion:

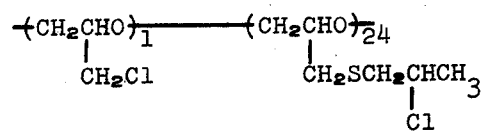

An infrared spectrum of the product exhibits a substantial reduction in the —OH peak at 3.0 microns when compared with an infrared spectrum of the polyether intermediate.

The polyether product of this example exhibits equivalent release and plastization properties when mixed with cellulose acetate polymers as did the polyether product of Example 1.

The procedure of Example 1 is repeated using different low molecular weight epihalohydrin polymers, mercaptoalkanols and halogenating agents such as hydrogen bromide. The resulting polyethers exhibit similar plastization and release characteristics when blended with other synthetic organic polymers.

What is claimed is:

1. The polyether represented by the general statistical formula:

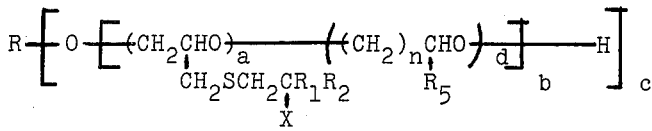

wherein R is hydrogen or the residue of an organic active hydrogen initiator selected from the group consisting of methanol, ethanol, 2-butanol, 1-octanol, ethylene glycol monomethyl ether, ethylene glycol monoethyl ether, ethylene glycol, propylene glycol, 1,3-butanediol, 1,4-butanediol, glycerol, sorbitol, polyethylene glycols, polypropylene glycols, polybutylene glycols, dihydroxypropyl ether of bisphenol A, ethylene chlorohydrin, glycerol dichloride, phenol, xylenol, p-chlorophenol, resorcinol, hydroquinone, phloroglucinol, bisphenol A, bis-p-hydroxyphenyl methane, sucrose, glucose, fructose, and maltose; $R_1$ and $R_2$ are individually hydrogen, alkyl having from 1 to 12 carbon atoms, aryl having from 6 to 12 carbon atoms, hydroxyalkyl having from 2 to 12 carbon atoms, aryloxyalkyl with aryl having from 6 to 12 carbon atoms, or alkoxy having from 1 to 12 carbon atoms; X is chloro or bromo; $R_5$ is alkyl having from 1 to 4 carbon atoms and substituted alkyls thereof selected from the group consisting of haloalkyl, mercaptoalkyl, alkoxyalkyl wherein alkoxy has from 1 to 20 carbon atoms, aryloxyalkyl wherein aryloxy has from 6 to 20 carbon atoms, and alkyl thioalkyl wherein alkylthio has from 1 to 20 carbon atoms, and aryls having from 6 to 12 carbon atoms and substituted aryls thereof selected from the group consisting of haloaryl, mercaptoaryl, alkoxyaryl, and aryloxyaryl; $a$ is a positive integer and $d$ is O or a positive integer provided that the ratio of $a$ to $d$ is from about 1:8 to 1:0; and b is a positive integer from 1 to 125; $c$ is a positive integer from 1 to 8; and $n$ is a positive integer from 1 to 4, said polyether having a molecular weight from about 300 up to about 15,000.

2. A polyether represented by the formula:

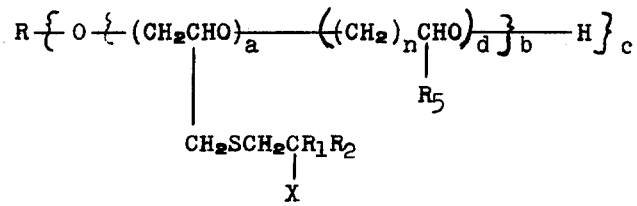

wherein $R_1$ and $R_2$ are hydrogen, R is the residue of propylene glycol, $R_5$ is chloromethyl, X is chloro or bromo, $a$ is a positive integer, $d$ is O or a positive integer with the proviso that the ratio of $a$ to $d$ is from about 1:8 to 1:0, $b$ is a positive integer from 1 to 125, $c$ is 2, $n$ is a positive integer from 1 to 4, said polyether having a molecular weight from about 300 to 15,000.

3. The polyether according to claim 1, wherein $R_1$ is methyl, $R_2$ is hydrogen, R is the residue of isopropanol and $R_5$ is chloromethyl.

* * * * *